Oct. 11, 1932.　　　C. B. IRVING　　　1,881,614
RECORD POSTING DEVICE
Filed Dec. 21, 1928　　2 Sheets-Sheet 1

INVENTOR.
Clarence B. Irving
BY Roy E. Hamilton
ATTORNEY.

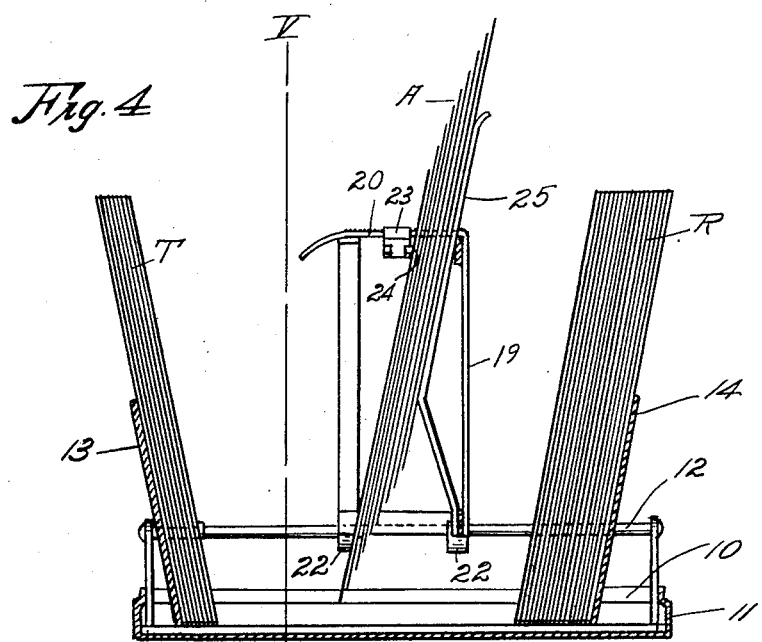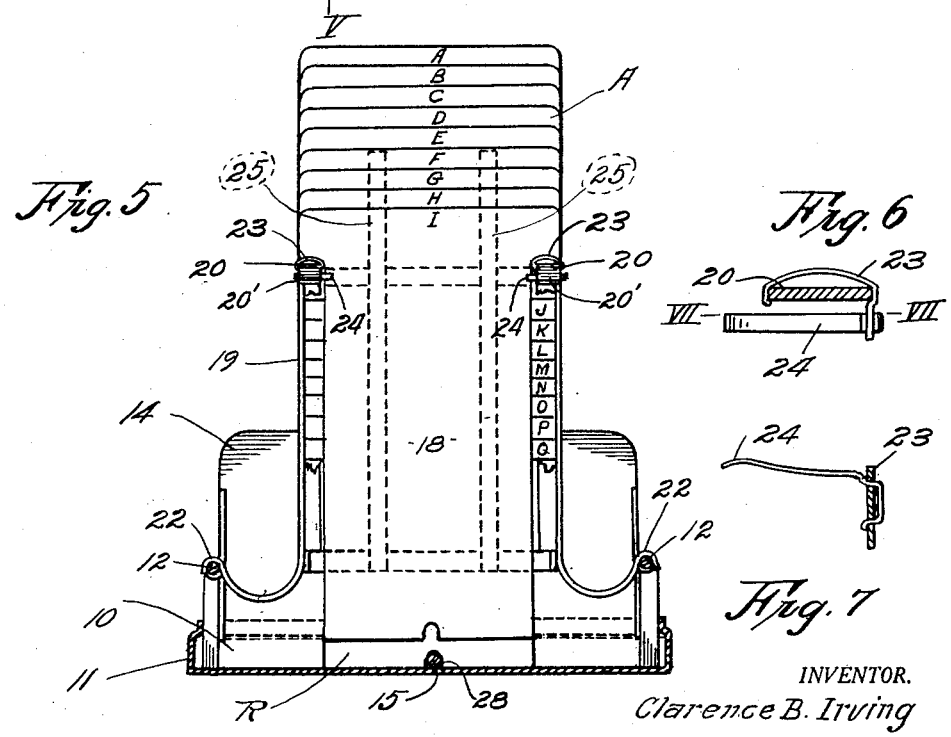

Patented Oct. 11, 1932

1,881,614

UNITED STATES PATENT OFFICE

CLARENCE B. IRVING, OF KANSAS CITY, MISSOURI, ASSIGNOR, BY MESNE ASSIGNMENTS, TO WILSON-JONES COMPANY, OF CHICAGO, ILLINOIS, A CORPORATION OF MASSACHUSETTS

RECORD POSTING DEVICE

Application filed December 21, 1928. Serial No. 327,536.

This invention relates to visible record posting devices and especially to that type in which record sheets are placed in a substantially vertical position at the rear side of the device, then positioned on a sheet-carrying rack to expose the upper portion of each sheet of a series to facilitate rapid selection of the sheets to be posted.

In the ordinary record posting device now in use only the first sheet of the series of record sheets is visible to the operator so that in order to locate an intermediate sheet, it is necessary to remove the preceding sheets. In this method of posting, it is difficult to locate the particular intermediate record sheet desired and the posting process is materially hindered.

In the present invention, this difficulty is overcome by means of progressively shouldered sheets which when placed on an intermediate rack, are supported in a raised position with the upper portion of each sheet of said series exposed so that any desired sheet of the series may be quickly detected and removed for posting.

One object of the present invention is the provision of a record-posting device having a series of record sheets, each sheet of said series having oppositely disposed shoulders at a shorter distance from its upper edge than the next succeeding sheet.

A further object of the present invention is the provision of a posting tray having parallel side rods, a front and a rear record-sheet support, and a rack positioned on the parallel side rods intermediate said sheet supports for supporting the record sheets in a raised position.

Another object of the present invention is the contemplation of a rack for supporting a series of progressively shouldered sheets in a raised position and means associated with said rack for securing said sheets in position against accidental displacement.

Still other objects of the present invention are simplicity and economy of construction, ease of operation, and adaptability to various types of machine posting devices.

With these general objects in view as well as minor objects which will appear during the course of the detailed specification, reference will now be made to the accompanying drawings in which:

Fig. 4 is a longitudinal vertical section of the device with parts broken away;

Fig. 5 is a cross-sectional view taken on line V—V of Fig. 4;

Fig. 6 is a sectional view taken on line VI—VI of Fig. 2; and

Fig. 7 is a sectional view taken on line VII—VII of Fig. 6.

Figure 1:
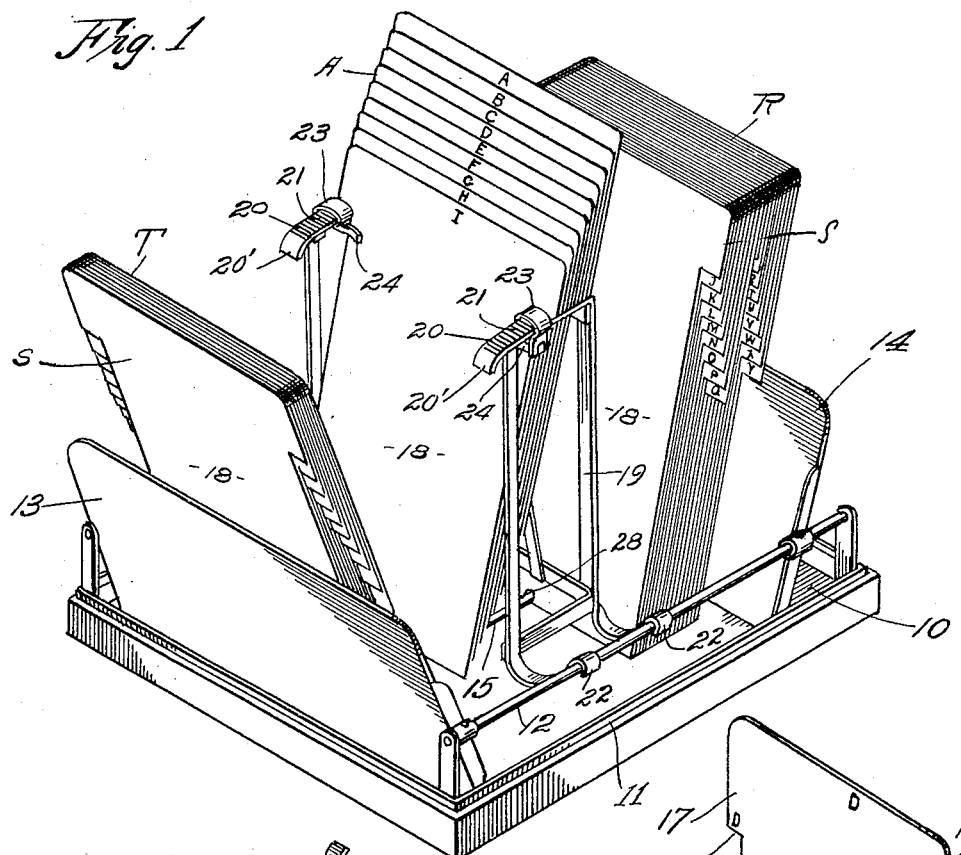
Figure 1 is a perspective view of a visible record posting device embodying this invention.

Like reference characters designate like parts throughout the several views and numeral 10 designates a machine posting tray comprising a body portion 11, parallel lock rods 12, 12 carried by body 11, a front wing 13 and a rear wing 14 adjustably carried by the lock rods for supporting the sheets in a substantially vertical position. While the above described posting tray is shown and described, it is apparent that this structure may be materially varied to include any of the well-known binder or tray types of machine posting devices.

Positioned adjacent the bottom of the tray parallel with lock rods 12, 12 is a guide rod 15 which is positioned for engagement with a U-shaped slot in the record sheets for maintaining the sheets in alinement.

Figure 3:
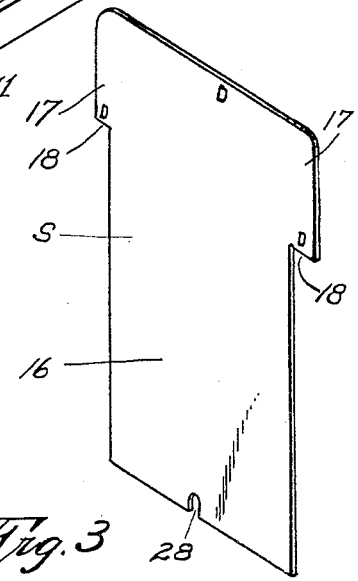
Fig. 3 is a perspective view of one of the record sheets.

The sheets S to be used in this device are of special construction as clearly shown in Figs. 1, 3, and 5. The body 16 of the sheet is provided at its upper portion with oppositely disposed offset portions 17 to form ledges or shoulders 18 and has a U-shaped slot 28 centrally located at its lower edge. However, this slot is only necessary for alining the sheets and be omitted and other means for alining the sheets substituted therefor. These record sheets are in series of any suitable number, each successive sheet of the series having its shoulders positioned a slightly greater distance from the top edge thereof, than the next succeeding sheet so that when the ledges 18 of the series of sheets are in perpendicular alinement with the surface of said sheets, the upper portion of each sheet of the series will be exposed to the view of the operator. Furthermore, as clearly shown in Fig. 1, when the sheets are in the initial position in the tray with their top edges in a common horizontal plane, the shoulders of the various sheets of the series will be offset, thus exposing a portion of each sheet adjacent each of said shoulders.

To facilitate the posting in this type of device, it becomes necessary to provide means for supporting one or more series of said record sheets in a raised position above the tray so that each of said sheets may be supported by its respective shoulders in order to expose to the operator the upper portion of the sheet thereof. For this purpose a rack 19 is provided which is adjustably mounted on the lock rods 12, 12 intermediate the front and rear wings 13 and 14. Rack 19 may be made of skeleton form with a pair of horizontally disposed spaced-apart parallel arms 20, 20, each having its outer end 20' rounded and projecting beyond the front portion of the rack. The upper surfaces 21 of the arms are knurled to prevent accidental slipping of the sheets when supported thereon.

Figure 2:
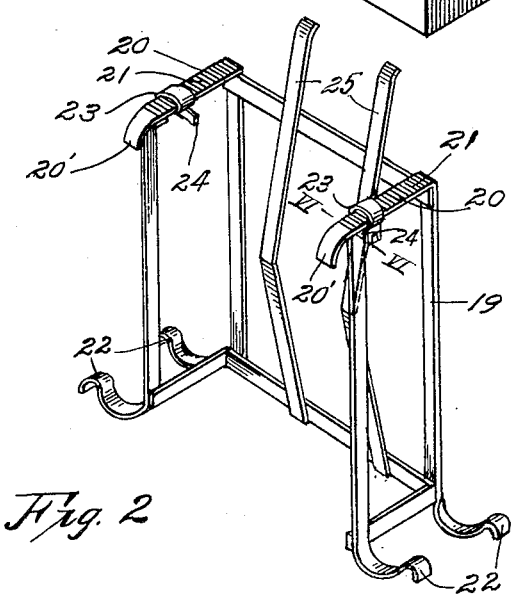
Fig. 2 is a perspective view of the rack detached.

For engagement with the lock rods 12, 12, a pair of hook members 22, 22 are provided at each side of said rack, as clearly shown in Fig. 2. These hook members are preferably open at the bottom so that the rack may be easily lifted from the supporting rods. Clampingly mounted on each of said parallel arms 20 is an arcuate clamp member 23 having its inner and outer end portions bent downwardly and shaped to frictionally engage the sides and adjacent edge portions of each of the arms. The clamping member is frictionally mounted in such a manner that it may be adjusted longitudinally on the arm, each of said clamping members being provided with a downwardly projecting member for receiving and supporting the channel-shaped portion of an inwardly projecting resilient finger 24 which projects beyond said arm and is adapted to engage the sheets placed on said rack to prevent accidental displacement thereof. For holding record sheets placed on the rack 19 in a forwardly and downwardly inclined position, for the purpose of properly supporting the sheets and to present them in the proper line of vision for the operator, the rack is provided with a pair of spaced-apart vertical guide rods 25, 25, each of which is forwardly inclined from the opposite ends thereof to the center thereof. These rods are spaced apart, as clearly shown in Fig. 2, to facilitate the easy removal of some of the sheets positioned on said rack by permitting the flexing of the sheets positioned behind the sheet to be removed, thereby separating the same to permit the operator to insert his finger between said sheets and thereby grip the sheet or sheets to be removed.

By referring to Fig. 4, it will be noted that when the sheets are in position on rack 19, all sheets of the series are spaced above the tray, thus permitting each sheet to be supported at its shoulders on the parallel arms 20.

In the operation of this device, the record sheets which usually consist of a large number including several series of progressively shouldered sheets are positioned in the tray against the rear support with a portion of each sheet adjacent the shoulders thereon exposed to view. Each of said visible portions may be properly marked for identification corresponding with a marking at the top of the sheet. One or more series of the record sheets are now lifted from their initial position and placed on the rack 19 when each sheet will be shifted to rest on its ledges 18, and due to the unequal spacing of the ledges on the separate sheets of a series from their respective upper edges, a portion of each sheet, bearing suitable identification marks, will be visible to the operator. The clamping members, if desired, are then moved rearwardly on arms 19 so that the resilient fingers will engage the sheets as stated above.

For example, the operator now wishes to make an entry on record sheet C of the series A, B, C, D, E, F, G, H, and I. All of the sheets in front of C are moved forwardly, flipped past the resilient fingers 24, and permitted to slide down over the rounded end 20' of the arms 20 and into position against the front wing 13. Sheet C is then removed, the entry made, and it is positioned in its regular order against sheets resting on wing 13. This operation is repeated until all record sheets on the rack are disposed of and a new series is then brought forward from their position against the rear wing and the posting continued as described above.

As shown in Figs. 1 and 4, the sheets R are in the initial position against the rear wing, sheets A are positioned on the rack for posting, and sheets T are in position against the front wing, having been posted.

It is apparent that this device, as described, greatly increases the efficiency and usefulness of this type of posting device and makes it possible to handle a much larger number of accounts in a given period of time.

While I have illustrated and described what is now deemed to constitute the preferred form of the embodiment of the invention, I desire to reserve the right to make all formal modifications as may fairly fall within the scope of the appended claims.

What I claim is:

1. The combination with a posting device comprising a body member, parallel side members carried by said body member, and a front and a rear wing adjustably carried by said side members, of a record sheet supporting rack adjustably carried by said side members intermediate said front and rear wings.

2. The combination with a record sheet posting device having a body portion and means for supporting record sheets at different heights, of a series of progressively shouldered record sheets adapted to be carried by said supporting means.

3. The combination with a posting device having a body member and parallel side members supported thereby, of a rack adjustably carried by said side members, said rack having side arms for supporting record sheets, and means associated with said arms for maintaining said record sheets in an inclined position.

4. A posting device comprising a tray, parallel lock rods carried by said tray, a front and a rear wing adjustably mounted on said rods, a rack adjustably carried by said rods intermediate said front and rear wings, said rack having horizontally disposed arms, inclined rods carried by said rack intermediate said arms, and a series of progressively shouldered record sheets adapted to be positioned in substantially horizontally aligned relation against either of said wings, or in vertically offset relation on said arms.

5. A posting device comprising a body member, parallel lock rods carried by said body member, a front and a rear record sheet supporting wing adjustably carried by said lock rods, a sheet-supporting rack carried by said lock rods, said rack including a pair of spaced-apart parallel arms having downturned forward ends and a plurality of hook members adapted to slidably engage said lock rods intermediate said front and rear wings, an inturned resilient finger adjustably carried by each of said arms respectively, and approximately vertical rods forwardly inclined from their ends to their centers, carried by said rack intermediate said arms.

6. A posting device comprising a body portion, a series of record sheets having shoulders carried by said device, the shoulders of said sheets being at progressively greater distance from the tops of the sheets, a front and rear sheet-supporting wing carried by said body portions for supporting said record sheets in an inclined position and in substantial alignment, and a rack carried by said body portion intermediate said wings for supporting said record sheets by the shoulders thereof in vertically offset relation.

7. A posting device comprising a body member, a stack of record sheets supported by said body member, said sheets having supporting shoulders, each sheet having its shoulders at greater distance from the top thereof than the preceding sheet, front and rear sheet-supporting wings slidably disposed above said body members and cooperating therewith for maintaining the top of said sheets in substantially horizontal position, and a rack carried by said body portion intermediate said wings for engaging the shoulders of said sheets for supporting said sheets in an inclined position and in vertically offset relation.

8. The combination with a posting device comprising a body member, a rack adjustably carried by said body member, said rack having arms for supporting record sheets, and means on said arms for preventing the record sheets from slipping thereon.

9. The combination with a posting device comprising a body member, parallel side members secured to said body member, a series of progressively shouldered record sheets for said device, means adjustably carried by said side members for engaging the shoulders of said sheets for supporting the same above said body, and means on said last-mentioned means for preventing accidental displacement of said record sheets while on said last-mentioned means.

10. A record posting device including a member for supporting a plurality of sheets in an inclined position, and fingers on said member for maintaining said sheets in position, said fingers being yieldable to allow said sheets to be flipped past said fingers and off said member.

11. A sheet-holding rack including a frame, a plurality of hooked supporting members secured to said frame, a plurality of arms on said frame for holding sheets in a raised position, said arms having knurled portions for preventing the sheets from slipping thereon, means on said arms for preventing accidental displacement of the sheets while the same are in raised position, and spaced members on said frame for supporting the sheets in an inclined position.

12. In a posting tray having sheet-supporting end wings, a sheet-supporting rack located in said tray between said wings and spaced inwardly from each end wing, said rack embodying means for sustaining sheets in an inclined position and means for normally preventing movement of said sheets in one direction, said means being displaceable for permitting movement of said sheets in said direction.

13. In a posting tray having sheet-supporting end wings, a sheet-supporting rack between said wings, and displaceable elements on said rack for normally preventing sheets on said rack from being swung toward one of said wings.

14. In a posting tray having sheet-supporting end wings, a sheet-supporting rack having an upwardly inclined back located between said wings, and displaceable means on said rack for normally preventing the movement of loose sheets on said rack in a direction opposite to the inclination of said back.

15. In a posting tray having a front wing and a rear wing adapted for sustaining loose sheets, a rack between said wings, in combination with a series of loose sheets supported upon said rack, each sheet having a pair of shoulders at a different elevation than the shoulders on the next succeeding sheet for engaging said rack for exposing an upper margin of each sheet on said rack.

In testimony whereof, I hereunto affix my signature.

CLARENCE B. IRVING.